United States Patent [19]

Joby et al.

[11] 4,018,044

[45] Apr. 19, 1977

[54] ELECTRONIC FUEL CONTROL FOR A GAS TURBINE ENGINE

[75] Inventors: Michael John Joby, Solihull; Paul Manwaring Maker, Loughton, both of England

[73] Assignee: Lucas Industries Limited, Birmingham, England

[22] Filed: July 7, 1975

[21] Appl. No.: 593,388

[30] Foreign Application Priority Data

July 9, 1974 United Kingdom ............ 30314/74

[52] U.S. Cl. ..................... 60/39.16 R; 60/39.28 R
[51] Int. Cl.² ......................................... F02C 9/04
[58] Field of Search ................ 60/39.28 R, 39.16 R

[56] References Cited

UNITED STATES PATENTS

| 3,098,356 | 7/1963 | Joline | 60/39.28 R |
| 3,421,317 | 1/1969 | Bedford | 60/39.28 R |
| 3,523,423 | 4/1970 | Young | 60/39.16 R |
| 3,606,754 | 9/1971 | White | 60/39.28 R |
| 3,638,422 | 2/1972 | Loft et al. | 60/39.28 R |

Primary Examiner—William L. Freeh
Assistant Examiner—Robert E. Garrett

[57] ABSTRACT

An electronic fuel control for a gas turbine engine having a gas generator and a separate power turbine includes gas generator and power turbine actual speed transducers, gas generator and power turbine desired speed signal generators, error amplifiers connected to the respective transducers and generators, a "low wins" gate for selecting the lower error, an acceleration control limiter passing the selected signal from the gate to an integrator and an output difference amplifier producing an output signal determined by the difference between the integrator output and that of the gas generator transducer to control the fuel flow to the engine.

5 Claims, 1 Drawing Figure

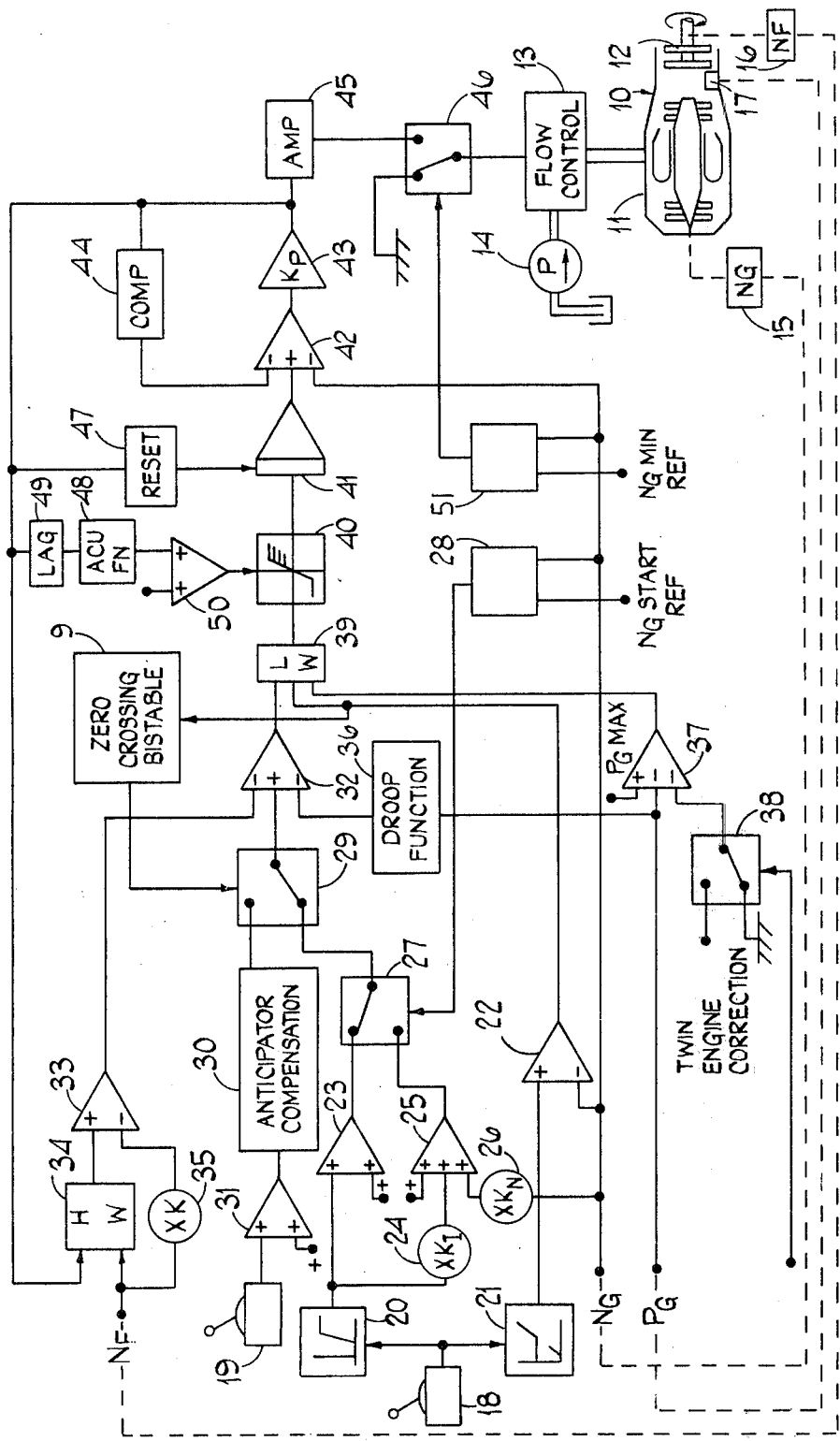

ELECTRONIC FUEL CONTROL FOR A GAS TURBINE ENGINE

This invention relates to an electronic fuel control for a gas turbine engine having a gas turbine gas generator and a separate power turbine driven by said gas generator. It is an object of the invention to provide such a fuel control in a convenient form.

A fuel control in accordance with the invention comprises means for generating a gas generator speed demand signal, a first difference amplifier for comparing said gas generator speed demand signal with a gas generator actual speed signal to produce a gas generator speed error signal, means for generating a power turbine speed demand signal, a second difference amplifier for comparing the power turbine speed demand signal with a power turbine actual speed signal to produce a power turbine speed error signal, an error signal selection circuit connected to said difference amplifiers and arranged to pass forward the lower of said error signals, an acceleration control connected to limit the magnitude of the selected error signal, an integrator for integrating the selected error signal, an output difference amplifier for comparing the output of the integrator with the gas generator actual speed signal to produce a fuel error signal and a fuel flow control device sensitive to said fuel error signal to vary the flow of fuel to the engine.

An example of the invention is shown in the accompanying drawing which is a block diagram of the fuel control.

The engine 10, to be controlled has a gas generator 11, in the form of a normal gas turbine engine, and a power turbine 12 which is free from the spool of the gas generator and is driven by the exhaust of the gas generator 11. A fuel flow control 13 controls the flow of fuel pumped by an engine driven pump 14 to the gas generator combustion chamber. The control 13 controls the pressure applied to the fuel supplied to the burners of the gas generator so that this pressure is directly proportional to the electrical signal the control 13 receives, fuel pumped by the pump 14 and surplus to the engines requirements being spilled back to a fuel reservoir.

Transducers 15, 16 and 17 are provided in the engine 10 to provide electrical signals corresponding to the gas generator actual speed $N_G$, the power turbine actual speed $N_F$ and the pressure $P_G$ from an hydraulic device sensitive to the torque applied to the free turbine. The main controlling parameters are the two actual speed signals $N_F$ and $N_G$, the pressure signal $P_G$ being used only to set fixed torque limits dependent on the manner in which the control is to be used.

Two manual controls 18, 19 are provided to produce gas generator speed demand and free turbine speed demand signals respectively. The control 18 is associated with two separate scheduling devices 20 and 21 of which the device 20 is only used during starting and which produces no output signal in the first 16° of displacement of the control 20, a signal rising linearly in the range 16° to 40° and a constant output signal for larger displacements. The scheduling device 21, on the other hand produces a constant output signal in the range 0° to 40° and a linearly rising output signal thereafter. A first difference amplifier 22 is connected to the transducer 15 and to the scheduling device 21 of the control 18, to produce a gas generator speed error signal which is of positive polarity when the actual speed signal is less then the speed demand signal.

The output terminal of the scheduling device 20 is connected to a first summing amplifier 23 to which a constant offset signal is also applied. This output terminal is also connected via a resistance network 24 to a second summing amplifier 25 to which a constant offset signal and a signal derived from the $N_G$ transducer 15 via a resistance network 26 are also applied. The sum signals from the two amplifiers 23, 25 are applied respectively to normally closed and normally open contacts of a first change-over relay 27 which is energised by a comparator circuit 28 having inputs from the $N_G$ transducer and from a reference supply referred to hereinafter as $N_G$START. The common contact of the relay 27 is connected to a normally closed contact of a second change-over relay 29. The normally open contact of the change-over relay 29 is connected to the output terminal of an anticipator compensation circuit 30 which is included when the system is used in connection with a helicopter engine. The circuit 30 is sensitive to pilot controlled changes in the collective pitch demand for the helicopter rotor blades, but since its function forms no part of the present invention the circuit 30 will not be further described. The circuit 30 has its input terminal connected to the output terminal of a third summing amplifier 31 which has its input terminals connected to the manual control 19 and to constant offset supply. The manual control 19 produces electrical output signal which is directly proportional to the displacement of the lever of the control 19. The relay 29 is energised by a zero crossing bistable circuit 9 sensitive to the output of the summing amplifier 22.

A second difference amplifier 32 has one of its input terminals connected to the common contact of the relay 29. Another input terminal of the difference amplifier 32 is connected to the output terminal of a third difference amplifier 33 associated with the $N_F$ transducer 16. In fact the difference amplifier 33 has one input terminal connected to the output terminal of a "highest wins" type gate circuit 34 having inputs, from the transducer 16 and from the output of the control as will be explained hereinafter. The other input terminal of the difference amplifier 33 is connected via a resistance network 35 to the $N_F$ transducer 16. During normal operation of the control the $N_F$ power turbine actual speed signal is positive and larger than the signal fed back from the output terminal of the control so that the two inputs to the difference amplifier 33 are the $N_F$ signal and an attenuated $N_F$ signal from the network 35. The output of the difference amplifier 33 is thus normally directly proportional to $N_F$. The exceptions to this normal operation will be explained hereinafter.

The difference amplifier 32 is connected so that in normal steady running or normal acceleration conditions (e.g. when the relay 29 is energised as will be hereinafter explained) it receives the output of the difference amplifier 33 and of summing amplifier 31 and produces a power turbine speed error signal which is of positive polarity when the power turbine speed demand signal from amplifier 31 exceeds the attenuated power turbine actual speed signal from the difference amplifier 33. The difference amplifier 32 also has a further input from a droop function generator 36 connected to the pressure transducer 17 and arranged to increase the error signal from the difference amplifier 32 when the $P_G$ pressure signal rises as a result of an increased load on the power turbine.

The pressure transducer 17 is also connected to a fourth difference amplifier 37 which has a second input from a constant limit signal supply. A further input to the difference amplifier 37 is taken from the common contact of a further change-over relay 38 which has a grounded normally closed contact and a normally open contact connected to a twin engine correction signal supply, so that the error signal produced by the difference amplifier 37 is increased when the relay 38 is energised. Such energisation occurs when an input signal is received from the control of the other engine in a twin engine system to indicate that the other engine is operational.

The error signals from the three difference amplifiers 32, 22 and 37 are supplied to the input terminals of a "lowest wins" type gate circuit 39. This gate circuit 39 passes on to its output terminal the error signal which is algebraically lowest. Thus if all three error signals are of positive polarity, the one of lowest magnitude will be passed on. If all three error signals are of negative polarity (which is unlikely) the one of largest magnitude (i.e. the most negative) will be passed on.

The output terminal of the gate circuit 39 is connected via a limit circuit 40 to an integrator 41, the output terminal of which is connected to one input terminal of an output difference amplifier 42, which has another input from the $N_G$ transducer 15. The difference amplifier 42 produces a fuel error signal which is of positive polarity when the signal produced by the integrator 41 exceeds the $N_G$ gas generator actual speed signal. The output terminal of the difference amplifier 42 is connected to an amplifier 43 with a gain of less than unity and there is a feedback loop via a phase advance compensation circuit 44 to an additional input terminal of the output difference amplifier 42. This feedback loop is included to offset the effects of the lag in the main feedback loop through the engine and transducer 15 to the difference amplifier 42.

The output terminal of the amplifier 43 is also connected to a power amplifier 45 which drives the flow control 13 through the intermediary of normally open contacts of a relay 46 energised by a comparator circuit 51 which compares the signal from the $N_G$ transducer 15 with an $N_G$ minimum reference signal and energises the relay when the transducer output exceeds the reference signal.

The integrator 41 has a reset circuit 47 which is sensitive to the fuel error signal at the output terminal of the amplifier 43. The limit circuit 40 is designed to pass on any input signal received up to a variable positive limit or down to a fixed negative limit. The positive limit is determined by a function generator 48 sensitive to the output of the amplifier 43. A lag circuit 49 is interposed between the output terminal 43 and the input terminal of the function generator 48 and a summing amplifier 50 which adds in an offset signal is interposed between the generator 48 and the limit circuit 40. The function generator 48 may for example, be arranged to reduce the positive limit linearly with increasing fuel error signal.

In steady running conditions, the signals received by the "lowest wins" gate circuit 39 are the gas generator speed error signal, the power turbine speed error signal and the error signal from the difference amplifier 37. In equilibrium one of these error signals (normally one of the speed error signals) will be zero and the others will be of positive polarity. The output of the gate circuit 39 will thus be zero and the integrator output will be constant. The fuel flow to the engine will thus be constant and at a rate sufficient to maintain the appropriate gas generator and power turbine speeds. In a situation where the zero error signal is the power turbine speed error signal, increasing the gas generator speed demand signal by use of the manual control 18 will have no effect, but decreasing the gas generator speed demand signal to a level such that the gas generator speed error signal becomes negative will result in the negative error signal passing from the "lowest wins" gate circuit 39 and progressively reducing the output of the integrator 41 at a rate initially determined by the fixed negative limit applied by the limit circuit and subsequently at a reducing rate until equilibrium is re-established When acceleration is demanded, i.e. when both speed error signals are greater than zero, the lower of these error signals will be limited in accordance with the output of the function generator 48 until the lower speed error signal is below this limit. Initially therefore the output of the integrator will increase linearly and the gas generator speed will follow this increase, until the speed error signal reduces to zero when the system will again be brought into equilibrium.

The arrangement of the circuit elements 33, 34 and 35 is intended to ensure that the system fails to a safe condition in the event of a total failure of the power turbine speed transducer 16. Normally the output signal from the "highest wins" gate 34 is the $N_F$ signal so that the output of the difference amplifier 33 is $(1-k)$ $N_F$ where $0 < k < 1$. The value of $k$ is chosen so that this is less than the output of the amplifier 43. In the event of loss of the $N_F$ signal the output of the difference amplifier 33 become equal to the output of the amplifier 43. Thus there is an increase in the output of amplifier 33 when such a failure occurs and this creates a negative signal from the difference amplifier so that the engine is decelerated. If the $N_F$ signal were simply compared directly with the power turbine speed demand signal then the failure of the $N_F$ transducer 16 would result in the signal from the difference amplifier 32 going positive — thereby causing the engine to accelerate.

It is to be understood that the fuel flow control 13 includes a manual reversion mechanism which enables the pilot to take control of the fuel flow should a failure such as that described above occur whilst the aircraft in which the system is used is airborne.

During engine starting, the sequence of operations is controlled by the relays 27, 29 and 46. These also commence the starting sequence in their normal positions as shown in the drawing. When the engine starting motor is operated and the gas ganerator starts to accelerate the comparator 51 senses when the minimum gas generator speed $N_G$ REF has been attained and relay 46 is energised. The manual control 18 is set for starting in the 16° to 40° range. The signal from the scheduling device 20 has the offset signal mentioned above added to it in the summing amplifier 23 and the sum signal is passed via the relay 29 to the difference amplifier 32, which also receives a signal corresponding to the output of amplifier 43 via the circit arrangement 33, 34, 35 described above. The resulting signal from the difference amplifier 32 is lower than error signals from the difference amplifiers 22 and 37 so that it passes to the integrator 41. As a result the output of the amplifier 43 is set to a level equal to the output of the summing amplifier 23 which is directly under the control of the pilot by use of the manual control 18. The fuel flow is at a constant level set by the manual control 18.

When the gas generator speed exceeds the $N_G$ START reference signal the relay 27 is automatically energised by the comparator 28, so that control is switched over to the amplifier 25. The flow to the engine is then dependent on the setting of the manual control 18, and on the $N_G$ gas generator actual speed signal and on the fixed offset signal applied to the summing amplifier 25. The fuel flow increases linearly with the gas generator speed.

When the $N_G$ gas generator actual speed signal exceeds the output of the scheduling device 21, the zero crossing circuit 32 energises the relay 29 and normal control of the engine can then proceed.

It is to be noted that the engine cannot be started unless there is a gas generator speed signal present.

We claim:

1. An electronic fuel control for a gas turbine engine having a gas turbine gas generator and a separate power turbine driven by the gas generator, the control comprising means for generating a gas generator speed demand signal, a first difference amplifier for comparing said gas generator speed demand signal with a gas generator actual speed signal to produce a gas generator speed error signal, means for generating a power turbine speed demand signal, a second difference amplifier for comparing the power turbine speed demand signal with a power turbine actual speed signal to produce a power turbine speed error signal, an error signal selection circuit connected to said difference amplifiers and arranged to pass foward the lower of said error signals, an acceleration control connected to limit the magnitude of the selected error signal, an integrator for integrating the selected error signal, an output difference amplifier for comparing the output of the integrator with the gas generator actual speed signal to produce a fuel error signal and a fuel flow control device sensitive to said fuel error signal to vary the flow of fuel to the engine.

2. An electronic fuel control as claimed in claim 1 in which said acceleration control is sensitive only to the output of the output difference amplifier to determine the limit applied to the selected error signal.

3. A electronic fuel control as claimed in claim 1 including means sensitive to the gas generator actual speed signal for disconnecting the fuel flow control device from the output difference amplifier when the gas generator actual speed signal is below a predetermined value.

4. An electronic fuel control as claimed in claim 1 in which the means for generating the gas generator speed demand signal comprises a manual control element, and a pair of scheduling devices operated by said manual control element one of said scheduling devices providing an output which is constant over an initial part of the range of movement of the manual control element and rises thereafter and which provides a signal to the first difference amplifier, and the other of said scheduling devices provides an output which rises in said initial part of the range of movement of the manual control element and is constant thereafter, and means sensitive to the sign of the error signal from the first difference amplifier for connecting said second scheduling device to the second difference amplifier instead of the means for generating the power turbine speed demand signal when the output of the first difference amplifier is positive during starting of the engine.

5. An electronic fuel control as claimed in claim 4 further comprising a first summing amplifier connected to the output terminal of the other scheduling device and arranged to add a fixed offset signal to the output of the other scheduling device, and a further summing amplifier connected to the output of the other scheduling device and to the gas generator actual speed signal via a resistance network, and a selector device sensitive to the gas generator actual speed signal for determining which of said summing amplifiers is connected to said sign-sensitive means during starting.

* * * * *